Oct. 8, 1940.  F. L. ALBEN  2,217,428
TRACTION MOTOR VENTILATING SYSTEM
Filed March 30, 1938   3 Sheets-Sheet 1
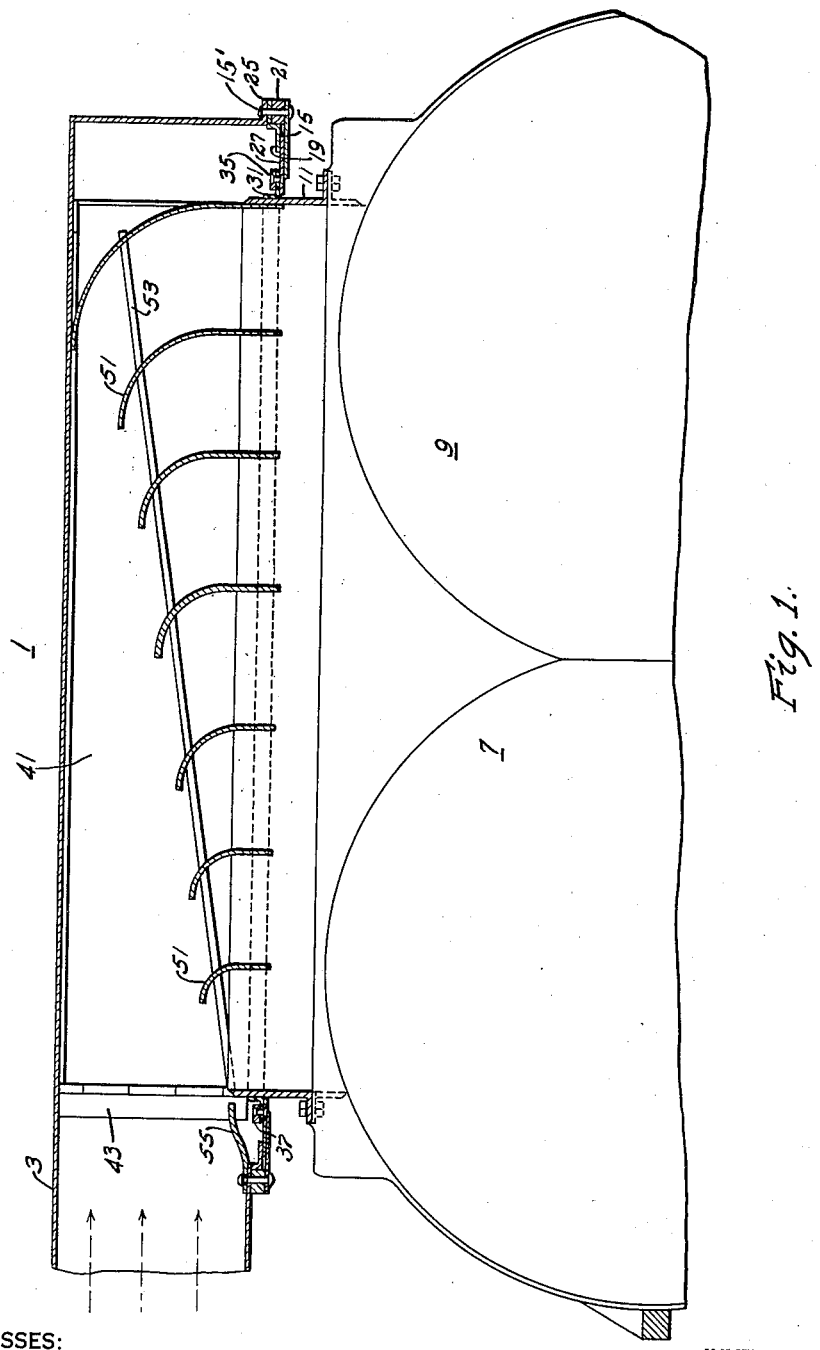
WITNESSES:
Leo M. Garman
Bernard L. Zangwill
INVENTOR
Frank L. Alben.
BY O.D. Buchanan
ATTORNEY

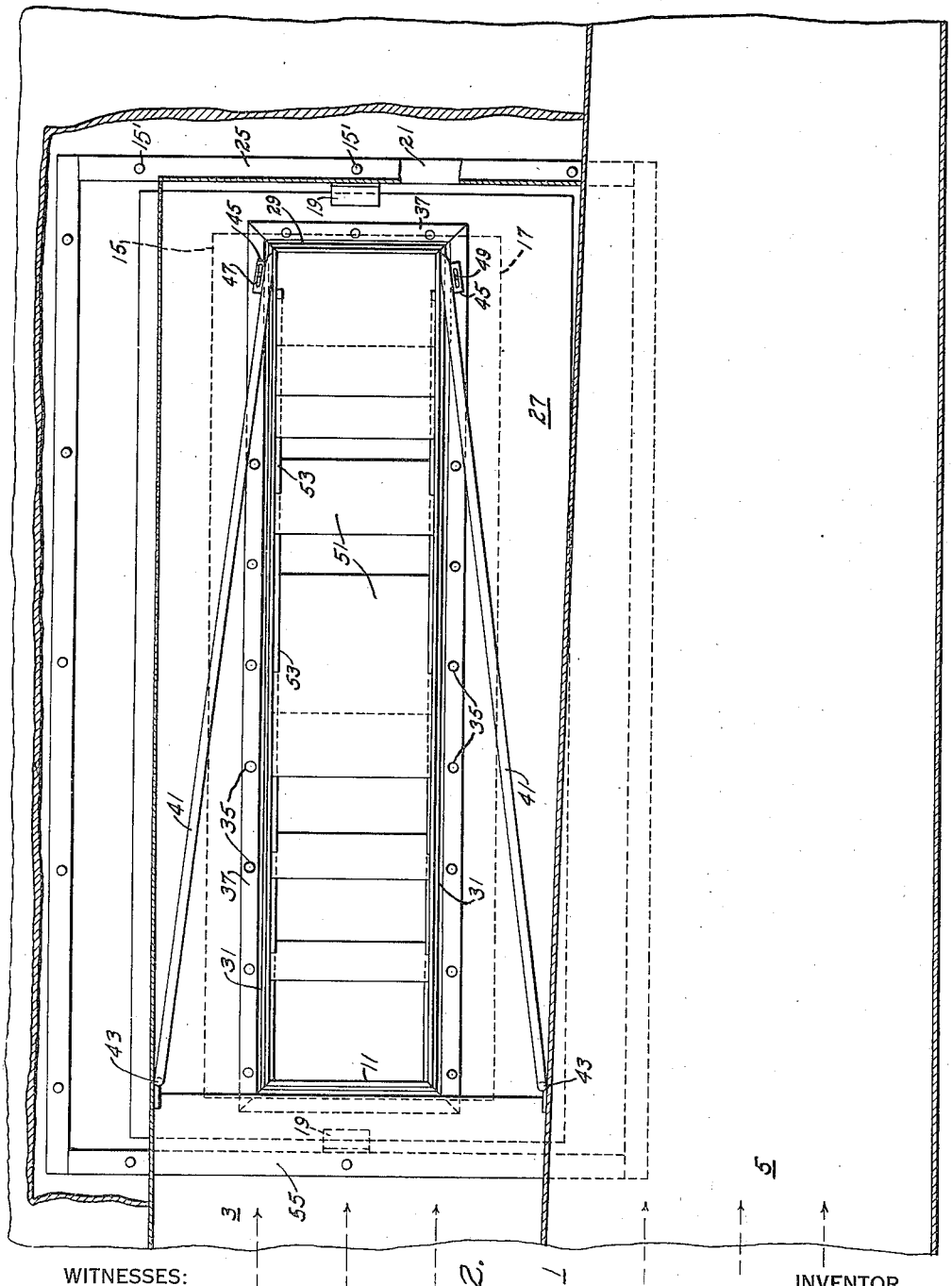

Oct. 8, 1940.　　　　F. L. ALBEN　　　　2,217,428
TRACTION MOTOR VENTILATING SYSTEM
Filed March 30, 1938　　　3 Sheets-Sheet 3
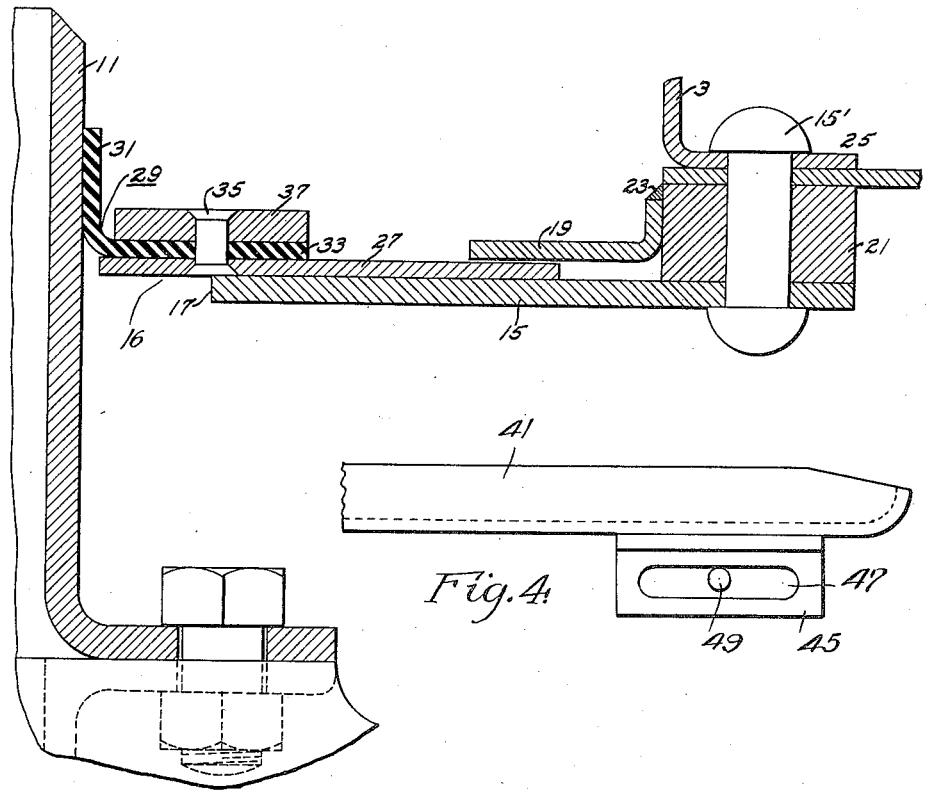
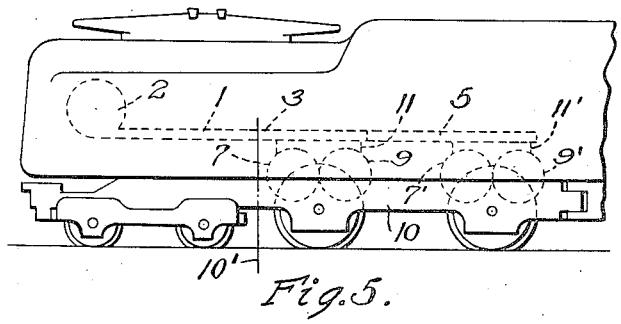
WITNESSES:
INVENTOR
Frank L. Alben.
BY
ATTORNEY Patented Oct. 8, 1940

2,217,428

UNITED STATES PATENT OFFICE 2,217,428

TRACTION MOTOR VENTILATING SYSTEM

Frank L. Alben, Pittsburgh, Pa., assignor to Westinghouse Electric & Manufacturing Company, East Pittsburgh, Pa., a corporation of Pennsylvania Application March 30, 1938, Serial No. 198,977

7 Claims. (Cl. 105—59)

In the application of electric power to driving locomotives, the driving motors are mounted on the main trucks. Under these circumstances the motors must be designed with relatively little cubic content for their high outputs inasmuch as the space available in which such motors can be mounted on a truck is extremely limited. In order to permit of high power output resort is made to forced ventilation for the motors and the blowers for creating the pressure in the ventilating system are usually mounted in the locomotive cab with a conduit system extending therefrom to the intake of the motor or motors which are cooled by the ventilating medium. Practical difficulties are encountered in supplying the motor on the truck with air from the conduit on the locomotive frame for the reason that the truck swivels with respect to the locomotive proper.

It is accordingly an object of my invention to conduct ventilating medium from a relatively stationary conduit to a swiveling branch duct with a minimum of air losses.

It is a further object of my invention to provide in a ventilating system having a stationary conduit and a relatively swiveling branch duct, a constant flow of ventilating medium into said branch duct without restriction. This feature is particularly important when a train is negotiating a sharp curve.

It is a further object of my invention to provide a seal between the duct and conduit effective at all times regardless of the relative position between the two, and which is made to operate with increased efficiency by the pressure of the ventilating medium in the conduit itself.

It is a further object of my invention to so design and construct the seal that no bolting of any sort is required with respect to the ventilating system when the motors are mounted in the locomotive truck. The motor intake duct is simply pushed into position, whereupon the air seal is automatically obtained.

It is still another object of my invention to provide a seal for a system such as has been described which is inexpensive to manufacture and maintain, simple in structure, and highly efficient.

Other novel features and elements of my invention will be apparent from a description thereof in the accompanying drawings of which:

Figure 1 represents a vertical sectional view through a conduit and motor intake, Fig. 2 is a horizontal sectional view right below the top of the conduit of Fig. 1, Fig. 3 is an enlarged sectional view of the seal between the conduit and motor intake duct;

Fig. 4 is a view showing a detail of a vane pivoting means; and

Fig. 5 is a diagrammatic view of part of a locomotive showing the relation of my invention thereto.

Referring to the drawings, it may be observed in Figs. 1, 2 and 5 that a conduit 1 serves as an outlet for ventilating medium from a blower 2. The conduit 1 is preferably supported in any suitable manner rigid with the locomotive underframe, and comprises two branch conduits 3 and 5. The branch conduit 3 serves to convey ventilating air to the twin driving motors 7 and 9 while the branch conduit 5 serves to convey ventilating air to the twin driving motors 7' and 9'; the motors being supported in any customary manner upon the locomotive truck 10 adapted to pivot or swivel about a conventional center pin structure whose axis is indicated at 10'.

The foregoing structure is well known, and my invention is directed to the manner in which the conduit structure is completed between the branch 3 and an intake duct 11 for the motors 7 and 9, and between the branch 5 and an intake duct 11' for the motors 7' and 9'. Since the two structures for the respective pairs of motors are virtually identical except, perhaps for the relative dimensions for appropriate clearances, the description hereafter is confined to the structure identified with the branch conduit 3 and motors 7 and 9.

In general, my invention seeks to provide an air seal which is simple in construction but which will nevertheless maintain its efficiency during the relative movements that occur between the truck 10 and motors therein, on the one hand, and the conduits, on the other, these movements obviously being swiveling of the truck about the axis 10' and swaying of the car and conduits with respect to the truck. The movements have, of course, vertical and horizontal components, and my novel seal permits of limited freedom of movement in the three primary directions, but sufficient for all running purposes, between the ducts and suitable openings in the branch conduits.

Referring now more particularly to Figs. 1 through 4 the intake duct 11 extends into a correspondingly shaped, but larger, opening in the bottom of the conduit 3 and, in accordance with my invention, I provide a seal between the duct 11 and the conduit 3 which effectively maintains the space between the duct 11 and conduit 3 closed during relative movement between the two.

The seal comprises a centrally apertured, frame-like member 15 secured by bolts or rivets 15' to the conduit 3 at the aforesaid opening. The outside dimensions of the frame are somewhat larger than the opening in the duct while the inside dimensions are smaller than the opening but larger than the duct 11 so that the frame 15 encompasses the duct with a clearance indicated in Fig. 3 by the reference numeral 16. In the particular embodiment shown, the inner periphery of the central aperture of the frame member 15 is identified by the reference numeral 17 and is rectangular in shape to correspond to the shape of duct 11.

Other elements rigidly secured to the conduit 3 comprise a plurality of angle clips 19 and a reinforcing and spacing frame 21 interposed between the conduit 3 and the outer portion of the frame member 15. Each angle clip 19 has a horizontal leg, vertically spaced from the frame 15, which serves to confine and guide a sliding frame member of the seal to be later described, and has a vertical leg which is welded or otherwise secured, as shown at 23, to the frame 21.

The seal further comprises a frame 27 that is slidingly supported upon the frame 15, being guided, as aforesaid, by the clips 19, and is somewhat smaller than the latter frame. The inner periphery of the frame 27 defines an opening similar in shape to the duct 11 and in proximity thereto. Secured to the plate 27 at about its inner periphery is an angular, ring-like gasket 29 having an upstanding side 31 and a horizontal side 33. The gasket 29 fits the duct 11 closely with the side 31 abutting it, while the other side serves as a means by which the gasket can be secured to the frame 27.

One manner of accomplishing this may be by means of rivets 35 clamping the gasket side 33 between frame 27 and a frame 37. I prefer to make the gasket of rubber although it is obvious that any other appropriate material may be used, for example, leather or gasket compositions.

The sliding joint or seal shown in Fig. 3 is entirely supported on a conduit 3 in the specific embodiment described. If it be desired to remove or insert the twin motors 7 and 9, the duct 11 readily slides along the gasket side 31 and no bolting or securing of any sort is required between the ventilating means and the motor in the mounting or dismantling of the motors on or from the truck, as the case may be.

The pressure of the air against the outside of the gasket side 31 automatically loads the gasket to form a tight seal along the intake duct 11 so that no air can escape. By having the plate frame 27 slide upon the frame 15, the duct 11 may move with respect to the conduit 3 and, therefore, with respect to the frame 15 without any leakage of ventilating air. The spacer frame 21 also acts to seal the conduit against the escape of air beyond the sliding joint action of the frames 15 and 27.

The sliding joint shown in Fig. 3 permits of what I call eccentric swiveling of the duct 11 in the outlet opening of the conduit 3. As is well known in the art, the truck supporting the twin motors pivots about the center pin axle 10' whenever the train is negotiating curves of any kind. The intake duct of the motor 11 being on the trucks and the conduit being on the locomotive frame, there is naturally a similar swiveling action between the two. If the intake duct were a circle oscillating about its center, the matter of sealing would indeed be simple. However, such is not the case here, and it is, therefore, necessary to utilize a seal which will permit of eccentric swiveling of the duct with respect to the conduit outlet. By eccentric swiveling I mean the rotation or oscillation of any form or shape of outlet about a point except the single peculiar case of a circle or part thereof about its center. Stated in another manner, by eccentric swiveling I intend to include any swinging or swiveling in which the distance along a given polar direction from the axis of swiveling to the outline of the swiveling object, in this case the duct 11 varies as the object swivels or swings.

To summarize the operation of my new seal, any relative horizontal movement of the duct 11 with respect to the outlet opening in conduit 3 is accomplished by a sliding action of the plate frame 27 along the frame 15, the clips 19 serving to guide the plate frame 27, and relative vertical movement of the duct 11 with respect to the conduit 3 is taken care of by duct 11 sliding with respect to gasket side 31. During this action the gasket portion 31 is maintained in sealing relation with the duct 11 by the pressure of the air in the conduit 3. If desired, lubricant may be supplied to lubricate the sliding surfaces between the plate frame 27 and frame 15. However, inasmuch as very little load exists between the sliding surfaces, lubrication is entirely optional. Where lubrication is used, it is to be noted that no lubricant can escape into the motor.

While my seal effectively prevents the escape of air from the conduit to any point other than the motor intake, I have found that it is additionally advisable to insure a constant supply of ventilating air to the motor at all times. Prior to my invention great variations in the supply of air to the motor were experienced in structures of the type described, particularly when the vehicle was negotiating a curve. In such instance eccentric swiveling of the duct in the conduit changed its effective intake area. My new seal permits of a constant opening of air duct into the conduit 11.

As a further means for securing a uniform air flow with a minimum of air losses, I provide vertical vanes 41, one end of each of which is hinged to the conduit in any suitable manner as, for example, by hinges 43, one at each side of the conduit opening. The other ends of the vanes have secured thereto plates 45 having elongated and oversized apertures 47. An upright pin 49 is secured to a sliding portion of the joint shown in Fig. 3, for example, the frame 37, and extends through the opening 47. If the intake duct 11 swivels with respect to the conduit, the sliding action of the joint moves the pins 49, deflecting the vanes 41 accordingly. These vanes extend substantially the full height of the conduit and serve to direct the incoming air toward the duct 11, thereby eliminating air losses and back pressure in the back end of the conduit 3.

To further facilitate the movement of the air from the conduit into the intake duct, I provide deflectors 51 of a gradually increasing height in the direction of flow of air, and secured rigidly in the intake duct 11 by any suitable structure, as for example, by straps 53, the forward end of which may be suitably secured to the forward end of the intake duct. A deflector 55 further serves to guide the incoming air in a smooth curve to the intake duct 11.

The swiveling action of the duct carries with it the deflectors 51. However, because of the directing action of the vanes on the air the deflectors handle substantially a constant volume of air regardless of the position of the duct.

It may thus be seen that by my new structure I have provided an effective seal permitting of eccentric swiveling of an air intake duct in a conduit outlet without any escape of air; and that I have provided a constant and uniform supply of air to the motors 7 and 9.

While I have illustrated my invention in a form which I now believe to be the best mode of application thereof, it is obvious that many changes may be made within the spirit and scope of my novel invention which I have disclosed. It is desired, therefore, that the appended claims be given the broadest construction consistent with their language and limited solely and only by the prior art.

I claim as my invention:

1. A ventilating system for a railway car having an underframe provided with a conduit rigid therewith, said conduit having an outlet opening in the bottom thereof, said car having a truck provided with a branch duct somewhat smaller than said outlet and cooperating therewith, said duct having limited movement in any direction relative to said conduit outlet including eccentric swiveling with respect to said outlet, and means for sealing the space between said duct and said conduit at said outlet by the pressure of the ventilating medium, regardless of the position of said duct relative to said conduit, the last said means comprising a sliding joint secured to said conduit, said joint having a flat, slidable, open-frame plate with an inner periphery larger than and spaced from said duct, and a compressible and flexible sealing member exposed to the pressure of the ventilating medium, said sealing member having angular sides with one side abutting said duct and another side abutting said flat plate, and means to secure one of said sides to said flat plate.

2. In a ventilating system for a railway car having a car underframe provided with a conduit having an outlet opening in the bottom thereof, a branch duct movable with respect to said conduit and smaller than said outlet, said duct having limited movement in any direction relative to said outlet including eccentric swiveling with respect to said outlet; and a sliding joint means between said duct and said conduit at said outlet, comprising a stationary, open-frame member secured to said conduit and having an inner periphery smaller than that of said outlet but larger than said duct, a substantially flat open-frame plate slidable on and smaller than said first member and having an inner periphery in proximity to said duct but larger than spaced from said duct, a seal having a flexible portion such as rubber between said duct and said flat plate, and means to attach said seal to one of the two last said elements and abutting the other.

3. A ventilating system comprising a conduit having an outlet opening in the bottom thereof, a branch duct having an opening slightly smaller than said outlet, said duct being capable of eccentric swiveling with respect to said conduit, means sealing the space between the outer periphery of said duct and the inner periphery of said conduit about said outlet, vanes having one end pivotally secured to said conduit at one end of said outlet opening, and means for supporting the other end of said vanes at the other end of said outlet to swing with said duct whereby the ventilating medium is guided directly to said duct whatever the position of the duct with respect to the conduit.

4. A ventilating system comprising a conduit having an outlet opening in the bottom thereof, a branch duct having an opening slightly smaller than said outlet, said duct being capable of eccentric swiveling with respect to said conduit, means sealing the space between the outer periphery of said duct and the inner periphery of said conduit about said outlet, vanes having one end pivotally secured to said conduit at one end of said opening, means for supporting the other end of said vanes at the other end of said outlet to swing with said duct whereby the ventilating medium is guided directly to said duct whatever the position of the duct with respect to the conduit, and curved deflectors mounted in the duct of gradually increasing size in the direction of flow of ventilating medium for directing the ventilating medium from said conduit into said duct.

5. A ventilating conduit having an outlet opening in the bottom thereof, a branch duct having an opening smaller than said outlet, said duct being capable of eccentric swiveling with respect to said conduit, a sliding joint, said joint having a stationary supporting frame member secured to said conduit and extending inwardly of the periphery of said outlet, and provided with a sliding surface, a sliding frame member abutting said surface and extending in proximity to said duct, the last said member being supported by the first said member, a flexible seal between said duct and the sliding plate member and attached to one of them, vanes with ends pivotally mounted at opposite sides of and at one end of said conduit opening, and means for mounting the other end of each of said vanes at the other end of said opening to swing with said duct whereby the ventilating medium is guided directly to said duct whatever the position of the duct with respect to the conduit.

6. A ventilating conduit having an outlet opening in the bottom thereof, an upwardly extending branch duct having an opening smaller than said outlet, said duct being capable of eccentric swiveling with respect to said conduit, a sliding joint between said duct and said conduit, said joint having a stationary supporting frame member secured to said conduit and extending inwardly of the periphery of said outlet and provided with a sliding surface, a substantially airtight sliding frame member comprising a flat plate having an opening therein with a periphery larger than said duct and spaced from said duct, said sliding frame member abutting said surface, the last said member being supported by the first said member, a flexible seal between said duct and the said flat plate, means for securing said seal to one of the two last said elements and abutting the other, and means for maintaining said sliding member in abutting relation to said stationary member.

7. In a ventilating system for a locomotive having a driving electric motor, comprising a ventilating conduit on said locomotive and having an outlet in the bottom thereof, a truck being capable of limited movement in any direction with respect to said conduit; an electric motor mounted on said truck, said motor comprising an upwardly extending air intake duct cooperating with said outlet and slightly smaller, said motor being disposed on said truck so that said motor duct swivels eccentrically with respect to said outlet upon swiveling of said truck, and means providing an air seal between said duct and conduit at said outlet whatever the position of the duct with respect to said outlet, said last means comprising a centrally-open plate member secured to said conduit and extending inwardly of said outlet, a second centrally-open substantially flat plate slidably abutting said first member, the inner periphery of said slidable plate being larger than said duct and spaced from said duct around its periphery, an angular flexible seal, having an upwardly-extending free side abutting said duct, whereby said motor intake duct may be pushed into position and automatically sealed, and means to secure said seal to said slidable plate.

FRANK L. ALBEN.